Dec. 24, 1957   E. ALBERT   2,817,817
MEASURING INSTRUMENT
Filed Aug. 30, 1954   3 Sheets-Sheet 1

*Inventor*
E. ALBERT
By *Philip M. Bolton*
*Attorney*

United States Patent Office 2,817,817
Patented Dec. 24, 1957

2,817,817

MEASURING INSTRUMENT

Eric Albert, Antwerp, Belgium, assignor to International Standard Electric Corporation, New York, N. Y., a corporation of Delaware Application August 30, 1954, Serial No. 453,081

Claims priority, application Netherlands October 23, 1953

4 Claims. (Cl. 324—142)

The invention relates to a measuring instrument for the measure of A. C. power. It is particularly applicable to power telemetering associated with power systems including one or more phases.

According to known practice for measuring A. C. power, use is made of wattmeters giving an output proportional to $I \cos \Phi$ ($I$ being the amplitude of the current, $\Phi$ the phase shift between current and voltage), the assumption being made that the voltage amplitude $E$ is constant. Therefore such wattmeters cannot be used for accurate measurements when the amplitude $E$ is subject to variations. Further, in three phased systems, the phases might be unbalanced and the measure of $I \cos \Phi$ instead of power in said phases is not sufficient since the value of the voltage amplitude $E$ might be different in the three phases.

Wattmeters giving an output directly proportional to $EI \cos \Phi$ are also known. A known wattmeter of the electronic type uses two quadratic valve detectors mounted in push-pull, but the two quadratic valve detectors must have rigorously identical characteristic parameters if the measured signal is to be a constant multiple of $EI \cos \Phi$ when the latter varies. This requirement if easy to satisfy in laboratories on a small scale, is difficult to meet on a commercial scale with telemetering systems, since costly compensating devices would have to be provided to keep these parameters identical in addition to adjusting means to account for valve ageing.

A first object of the invention is to provide an electronic wattmeter using only a one valve quadratic detector and giving an output which is a constant multiple of $EI \cos \Phi$.

A second object of the invention is to provide an electronic wattmeter of this type suitable to measure a sum of powers on two or more different lines, e. g. in a polyphase system.

According to a feature of the invention a measuring instrument is provided to measure the product $EI \cos \Phi$, where $E$ represents the amplitude of an A. C. wave, $I$ the amplitude of another A. C. wave having the same frequency as the first and $\Phi$ the phase shift between said waves, comprising electrical means having such a transfer admittance characteristic that when said waves are applied in a linear combination to the input thereof, the D. C. component of the output is of the form: $f(E, I) + kEI \cos \Phi$; $f(E, I)$ being an even function of $E$ and $I$ and $k$ a factor depending on the parameters of said transfer admittance, with the characteristic that periodic switching means are provided to alternately apply the sum and the difference of said A. C. waves to the input of said electrical means, that two condensers are provided in series only one of which at time is charged by said D. C. component of the output which is applied successively by said switching means to one then to the other of said condensers, the connections being such that the charging currents in the one then in the other condenser are opposed in direction, whereby the total across the said two condensers in series remains substantially a constant multiple of the product $EI \cos \Phi$.

According to another feature of the invention, a sum of products $E_i I_i \cos \Phi_i$ ($i=1, 2, \ldots n$) can be measured by said electrical means by providing additional switching means to feed the sum and the difference of paired waves to the detector during equal but distinct time intervals for each sum and for each difference, said switching means providing a repetitive cycle of $2n$ distinct intervals and during each interval said additional switching means connect one particular out of $2n$ condensers and one only so as to be charged by the D. C. output from said detector, the $2n$ condensers being serially connected so that a total voltage across them is obtained which is a constant multiple of the sum of the products $E_i I_i \cos \Phi_i$.

According to a further feature of the invention said electrical means consists of single tube with variable slope and a quadratic characteristic, said tube having a resistive output load in its cathode circuit, said sum and difference of said A. C. waves being applied between control grid and cathode.

According to yet another feature of the invention said electrical means consists of two tubes with variable slopes and quadratic characteristics, a common output resistive load inserted in the cathode circuit of the first of said tubes and in the anode circuit of the second of said tubes, the sum and difference of said A. C. waves being applied alternatively between the control grid and the cathode of said first tube whilst in synchronism the difference and the sum of said A. C. waves are applied alternatively between the control grid and the cathode of said second tube.

The above mentioned and other objects and features of the invention will become more apparent and the invention itself will be best understood by referring to the following description of an embodiment taken in conjunction with the accompanying drawings in which.

In electronic wattmeters of the type disclosed in Terman's Radio Engineers' Handbook, 1943, pp. 937–938, use is made of two square law vacuum tubes. Between the control grid and the cathode of the first tube is applied a potential $ae + bi$ ($e$ being instantaneous voltage and $i$ the instantaneous current of the circuit of which the power has to be measured while $a$ and $b$ are constants). Between the control grid and the cathode of the second tube is applied a potential $ae - bi$. The meter measures the D. C. component of the difference between the plate voltages, said difference being proportional to the difference between the plate currents $i_p$, the two tubes having the same anode load.

If we have respectively for the two tubes $$i_{p1} = a_0 + a_1 v_{g_1} + a_2 v_{g_1}^2 \tag{1}$$

$$i_{p2} = a'_0 + a'_1 v_{g_2} + a'_2 v_{g_2}^2 \tag{1'}$$

and $$v_{g_1} = ae + bi \tag{2}$$

$$v_{g_2} = ae - bi \tag{2'}$$

the difference between the plate currents is $$i_{p1} - i_{p2} = a_0 - a'_0 + (a_1 - a'_1)ae + (a_1 + a'_1)bi + (a_2 - a'_2)(a^2 e^2 + b^2 i^2) + 2(a_2 + a'_2)abei \tag{3}$$

since $$e = E \sin wt \quad (4)$$

$$i = I \sin (wt + \Phi) \quad (5)$$

the D. C. component will be $$(i_{v_1} - i_{v_2})_0 = a_0 - a'_0 + (a_2 - a'_2)\frac{a^2 E^2 + b^2 I^2}{2} + (a_2 + a'_2)ab EI \cos \Phi \quad (6)$$

and will only be proportional to $EI \cos \Phi$ and independent of $E^2$ and $I^2$ if $a_0 = a'_0$; $a_2 = a'_2$; i. e. if the two tubes have rigorously identical parameters. In general for tubes of similar types there is not much difference between $a_2$ and $a'_2$ and the condition $a_2 = a'_2$ can be satisfied easily by various methods. However, the condition $a_0 = a'_0$ is a more severe condition which is almost impossible to satisfy economically in measuring instruments used on a commercial scale for instance in telemetering equipment. If it cannot be satisfied, the measured voltage is not a constant multiple of $EI \cos \Phi$ and calibration is more difficult.

Figure 1:
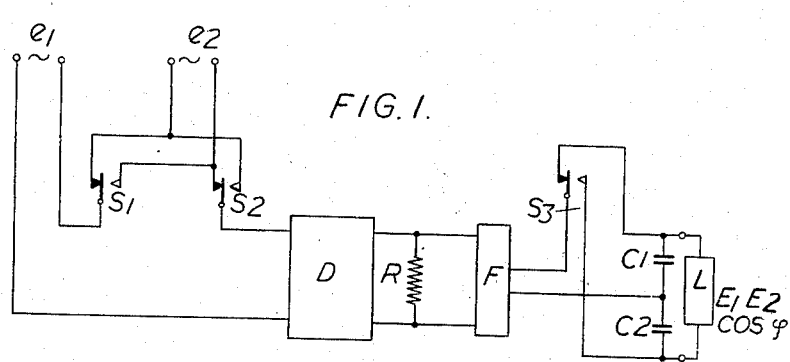
Fig. 1 shows a block diagram illustrating the principle of the measuring instrument according to the invention.

Referring to Fig. 1 where $e_1$ and $e_2$ are assumed to be A. C. voltages of same frequency, i. e.:

$$e_1 = E_1 \sin (wt + \Phi) \quad (7)$$

$$e_2 = E_2 \sin wt \quad (8)$$

it can be seen that with the switch contacts $s_1$, $s_2$ as shown, a voltage $e_1 + e_2$ is applied at the input of the detector D and with the contact $s_3$ as shown, the detector output across resistor R, of which the A. C. components are suppressed by the filter F, is applied to charge condenser $C_1$. If the switches $s_1$, $s_2$, $s_3$ are brought in the other position, a voltage $e_1 - e_2$ is applied at the input of detector D of which the filtered output is now applied to charge condenser $C_2$.

If the switch contacts $s_1$, $s_2$, $s_3$ are simultaneously caused to change over periodically at a suitable frequency, the total charge across the condensers $C_1$ and $C_2$ in series opposition as shown will be the difference between the D. C. components of the output voltages resulting from the respective input voltages $e_1 + e_2$, $e_1 - e_2$.

If the detector D has such a characteristic, e. g. output current versus input voltage, that for an input voltage which is a linear combination of $e_1$ and $e_2$, the D. C. component of the output current is of the form $$f(E_1, E_2) + kE_1 E_2 \cos \Phi \quad (9)$$

where $f(E_1, E_2)$ is an even function of $E_1$ and $E_2$, $k$ depending on the detector characteristic parameters, and $E_1$, $E_2$, $\Phi$, having the above mentioned significance, it will be clear that by changing the direction of $e_2$ (or $e_1$), in the linear combination of $e_1$ and $e_2$ at the input of the detector, the D. C. component of the output current becomes $$f(E_1, E_2) - kE_1 E_2 \cos \Phi \quad (9')$$

As switch contacts $s_1$, $s_2$, $s_3$ operate simultaneously, when $s_1$ and $s_2$ change the direction of $e_2$ at the input of the detector D, switch $s_3$ causes the output of said detector to be transferred from one to the other condenser. By connecting the load L between those terminals of the condensers which are not directly connected, an output which is a multiple of $E_1 E_2 \cos \Phi$ will be obtained.

If the detector characteristic is of the form given by (1), the output thereof will be of the form $$a_0 + a_1[e_1 + u(t)e_2] + a_2[e_1 + u(t)e_2]^2 \quad (10)$$

where $e_1$ and $e_2$ are respectively obtained from (7) and (8) and $u(t)$ is the switching function which passes alternately from 1 to $-1$ at an angular frequency $w_0$ corresponding to the switching period of the contacts $s_1$ and $s_2$, i. e.

$$u(t) = \frac{4}{\pi}\left(\sin w_0 t + \frac{1}{3}\sin 3w_0 t + \frac{1}{5}\sin 5w_0 t + \ldots\right) \quad (11)$$

Expression 10 can therefore be written as $$a_0 + \frac{a_2}{2}(E_1^2 + E_2^2) + a_2 u(t) E_1 E_2 \cos \Phi + \quad (10') $$
$$a_1 E_1 \sin (wt + \Phi) + a_1 u(t) E_2 \sin wt -$$
$$\frac{a_2}{2}E_1^2 \cos 2(wt + \Phi) - \frac{a_2}{2}E_2^2 \cos 2wt -$$
$$a_2 u(t) E_1 E_2 \cos (2wt + \Phi)$$

The filter F should eliminate all except the first three terms and this can be achieved by choosing $w_0$ reasonably small with respect to $w$ since then the lower but still significant side-band frequencies produced by the fifth and by the last terms will not interfere with the significant frequencies produced by the third term. Then, a low-pass filter with a cut-off frequency somewhat above $3w_0$ and below $w - 3w_0$ can be used. In this case, the output voltage from the filter F is substantially of the form $$a_0 + \frac{a_2}{2}(E_1^2 + E_2^2) + a_2 u(t) E_1 E_2 \cos \Phi \quad (12)$$

where for all practical purposes, $u(t)$ will still be alternately equal to 1 and to $-1$ at the rate determined by $w_0$. Therefore, contact $s_3$ operated at this same rate will alternately apply voltages of the form given by (9) and (9') to condensers $C_1$ and $C_2$ respectively.

The angular frequency $w_0$ should however not be chosen too low since otherwise when charging one condenser, the other will become affected by this charge through the load L. This depends on the nature and value of the load, but with a relatively high resistive load, much higher than the relative low output resistance of the filter F which will then determine the charge time constant of the condenser when it is directly connected to the output of the filter F through contact $s_3$, no difficulties will be encountered in selecting an appropriate angular frequency $w_0$.

The angular frequency $w_0$ should also be sufficiently low with respect to the charge time constant for the condenser connected to the output of the filter F via contact $s_3$ to permit the condenser to acquire a voltage substantially equal to that given by (12).

In practice it has been found adequate to select for $w_0$ a frequency of 10 c./sec. in relation to a frequency of 50 c./sec. for $w$ and to use RC filters in preference to LC filters since it has been found difficult to design a simple low-pass LC filter which does not result in undesired oscillatory overshoots for the voltages across the condensers.

More specifically, RC filters of the bridge type, i. e. those eliminating a particular frequency, have been found satisfactory. In one embodiment, the filter F was made up of two Wien bridges connected in cascade, the first bridge being tuned to the angular frequency $w$ and the second to $2w$. Both bridges were designed to limit as much as possible the attenuation of the low frequencies close to zero and an amplifier was inserted in the cascade connection.

When using such bridges, the input resistance of one of them may be used to constitute the load R.

The voltages $e_1$ and $e_2$ can be made proportional to any A. C. voltage or A. C. current for instance via voltage or current transformers.

For example, if the measuring instrument is to be used as an A. C. wattmeter, $e_1$ can be made proportional to the A. C. voltage $e$, whereas $e_2$ will be made proportional to the A. C. current $i$, therefore the output across the condensers will be proportional to $EI \cos \Phi$, E and I being the respective amplitudes of $e$ and $i$ and $\Phi$ their phase shift.

Figure 2:
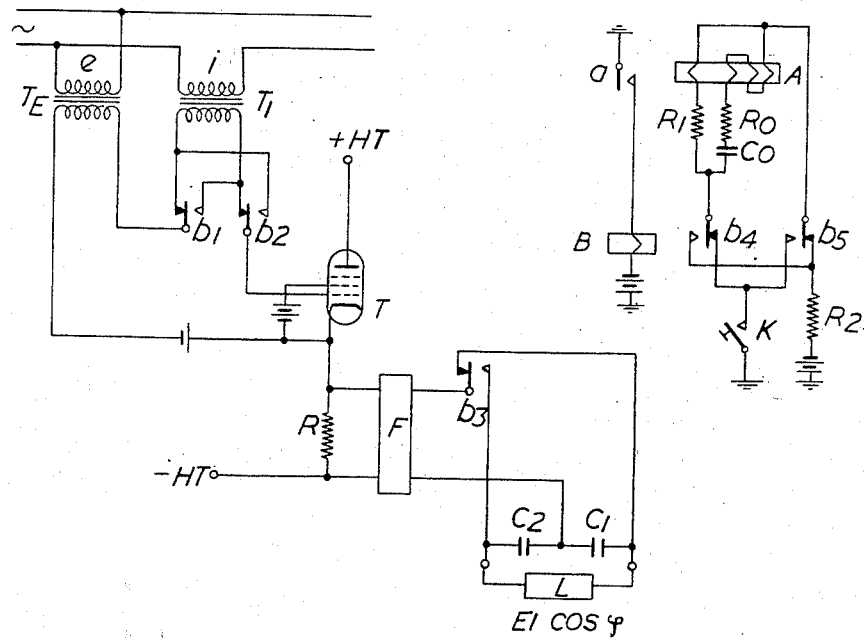
Fig. 2 shows an embodiment using only one tube with variable slope.

In the embodiment shown in Fig. 2 and used for power measurement, the switching means consist of a relay vibrating arrangement.

Relay A is a polarized relay. When the key K is depressed, an earth is given at one common terminal via the contact of the key and back contact $b_4$ of a relay B to the two branches of windings of relay A in parallel, these two branches including the respective serial connections of the resistance $R_1$ and of the resistance $R_0$ in series with the condenser $C_0$, and being connected at the other common terminal to a negative battery via back contact $b_5$ of relay B. Relay A operates after a delay depending on the charging time constant $R_0C_0$ of one of the said two branches. In turn relay B operates via make contact $a$ of relay A. This results in the reversal of currents in the two branches of windings of relay A in parallel since earth and battery are interchanged at front contacts $b_4$ and $b_5$ which causes the polarized relay A to release after a delay depending on the discharging time constant $R_0C_0$. Relay B then releases and a new reversal of current is caused in said two branches and so the reversals are continued periodically at a frequency depending on $R_0C_0$ provided that key K remains depressed. A relay vibrator is thus obtained in which relays A and B vibrate with the same frequency the contacts of relay B being used to switch the potentials at the input of the detector and to interchange the output condensers.

The embodiment shown in Fig. 2 is an example of measuring A. C. power.

The voltage $e_1$ is made proportional to the voltage $e$ by means of a voltage transformer TE across the A. C. line, whereas the voltage $e_2$ is made proportional to the current $i$ by means of a current transformer TI inserted in a conductor of the A. C. line. The detector consists of a quadratic law vacuum tube T (with variable slope) having a resistive load R in its cathode circuit.

The control potential applied between the control grid and the cathode of tube T is alternatively $e_1+e_2$, $e_1-e_2$ i. e. $ae+bi$, $ae-bi$ ($a$ and $b$ being the transformation ratios), since the secondary windings of transformers TE, TI are alternatively connected in series aiding and in series opposition by the periodically vibrating contacts $b_1$, $b_2$ of relay B.

The plate current of tube T is modulated and by applying successively the filtered output across the load R to condensers $C_1$ and $C_2$ as shown, the total charge across $C_1$ and $C_2$ in series will be a multiple of $EI \cos \Phi$.

Figure 3:
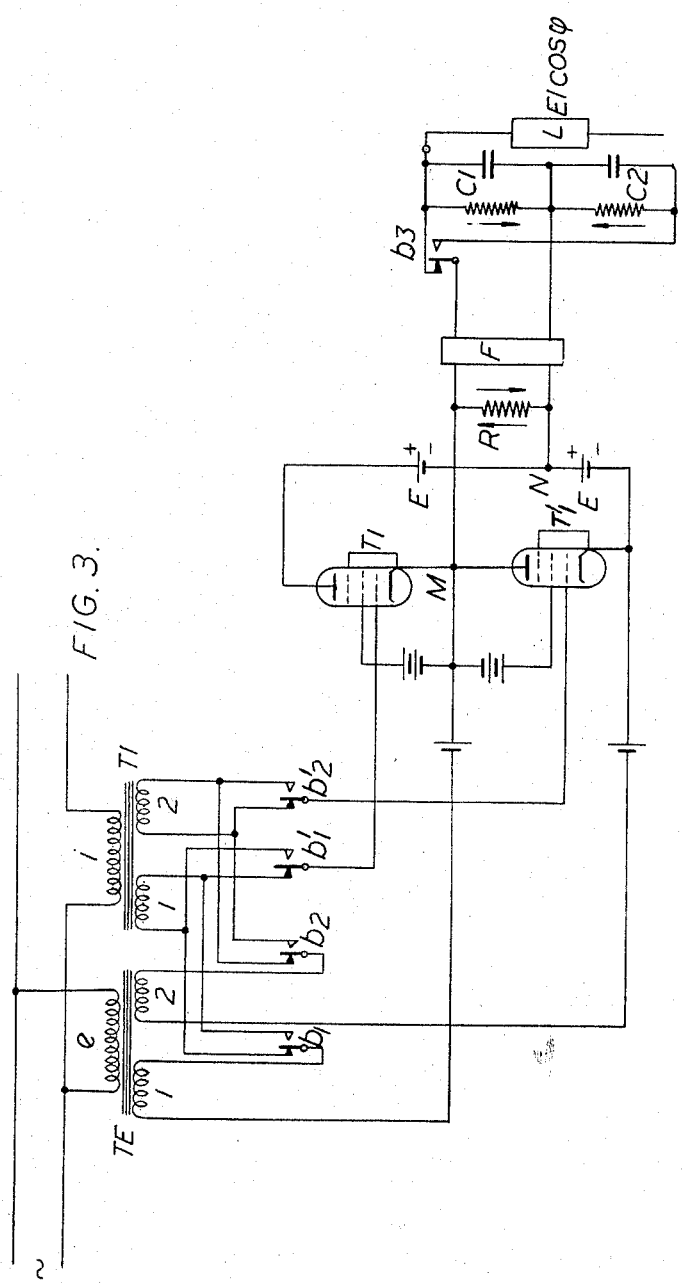
Fig. 3 shows an embodiment using two tubes with variable slope.

The D. C. component at the output of the detector defined by the first two terms of (10') will generally be greater than the third term which latter will produce the useful D. C. component across the two condensers in series. If this D. C. component which is eliminated across the two condensers in series proves to be a drawback, e. g. increases the voltage rating of the condensers, a differential detecting arrangement using two tubes may be used, as shown in Fig. 3.

The detector comprises two quadratic law vacuum tubes $T_1$ and $T'_1$, the cathode of tube $T_1$ being connected to the anode of $T'_1$ at point M, the two tubes having a common load resistor R in the cathode circuit of $T_1$ and in the anode circuit of $T'_1$. Separate HT sources are used for the two tubes, the negative pole of the HT source for $T_1$ being connected to the positive pole of the HT source for $T'_1$ at point N, the load R preceding the filter F being inserted between points M and N.

Between the control grid and cathode of tube $T_1$ are applied alternatively the potentials $ae+bi$, $ae-bi$ by means of the series connection (respectively aiding and in opposition) of the secondary windings 1 of transformers TE, TI completed via switching relay contacts $b_1$, $b'_1$ of relay B. Simultaneously between the control grid and cathode of tube $T'_1$ are applied alternatively the potentials $ae-bi$, $ae+bi$ by means of the series connection (respectively in opposition and aiding) of the secondary windings 2 of transformers TE, TI completed via switching relay contacts $b_2$, $b'_2$ of relay B.

By using $e_1$ for $ae$ and $e_2$ for $bi$, both respectively defined by (7) and (8), the output across the load R which results from the difference of the plate currents of tubes $T_1$ and $T'_1$ respectively given by (2) and (2'), the output will be of the form $$(a_0-a'_0)+\frac{a_2-a'_2}{2}(E_1^2+E_2^2)+(a_2+a'_2)u(t)E_1E_2\cos\Phi+$$
$$(a_1-a'_1)E_1\sin(wt+\Phi)+(a_1+a'_1)u(t)E_2\sin wt+$$
$$\frac{a'_2-a_2}{2}E_1^2\cos 2(wt+\Phi)+\frac{a'_2-a_2}{2}E_2^2\cos 2wt-$$
$$(a_2+a'_2)u(t)E_1E_2\cos(2wt+\Phi) \qquad (10'')$$

the eight terms thereof corresponding to the eight terms of (10'). The first two terms forming the DC component before filtering are however much smaller than the corresponding terms of (10') if there is some similarity between the two tubes. On the other hand, after filtering as explained previously, only the first three terms will remain and by charging the two condensers as shown, the output across the load will be a multiple of $E_1E_2 \cos \Phi$ independently of the similarity between the two tubes.

The measuring instruments described here before can be used for indicating and recording power measurements but they are also particularly suitable for power telemetering, for example with the systems described in the Belgian Patents No. 480,590 (W. Pouliart 13) and No. 487,907 (P. Walch 2).

Summation of power measurements made on two or more phases of polyphase systems can be performed in various ways.

One method consists in connecting in parallel a plurality of quadratic detectors each for measuring the power in a corresponding phase, the detectors having a common output resistive load and common filtering means. If the coefficients $a_2$ of the quadratic terms of all the detectors are made equal by correct adjustment (for instance adjustment of the screen potential of a variable slope pentode), the D. C. component of the total current flowing through the resistive load is proportional to the sum of the powers of each phase.

Only one pair of condensers $C_1$ and $C_2$ in series is required, as well as switching contacts to replace the input potential $e_1+e_2$ by $e_1-e_2$ in each detector simultaneously and to interchange in synchronism the connection to the condensers $C_1$ and $C_2$.

Figure 4:
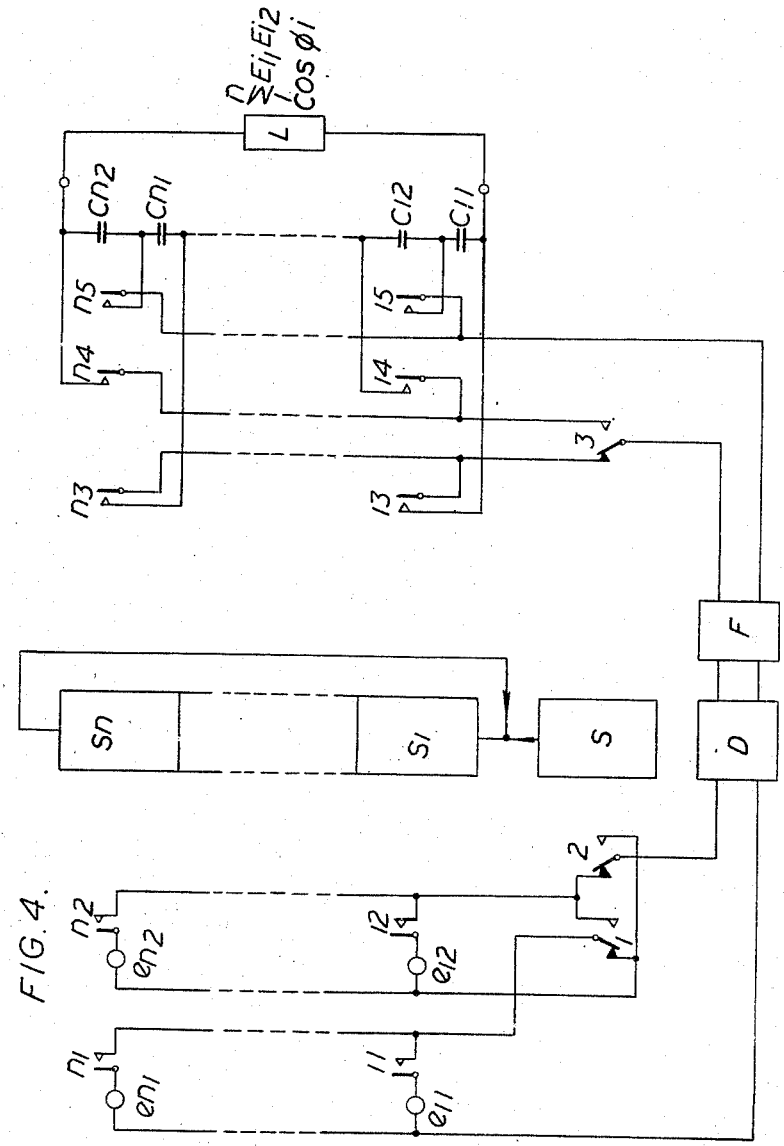
Fig. 4 shows an embodiment for summation of products $E_1 E_2 \cos \Phi$.

A method of which the principle is shown diagrammatically in Fig. 4 has the advantage to use only one detector D connected to the filter F, the input impedance of which constitutes the load for the detector. Preferably, this filter will consist of two Wien bridges connected in cascade.

The arrangement permits to measure the total power produced on several lines which may be independent. Sets of voltages such as $e_{11}$ and $e_{12}$ will be produced which are respectively proportional to the voltage and to the current on one particular line. Assuming that contacts 11 and 12 are closed, $e_{11}+e_{12}$ or $e_{11}-e_{12}$ will be alternatively connected to the input of the detector D depending on the position of the contacts 1 and 2 which move together and are controlled by the oscillator S which may be designed as shown in Fig. 2. The contacts 11 and 12 are controlled by the first stage $S_1$ of a counter $S_{1/n}$ which is driven by the oscillator S from one position to the other for every period of the oscillator S. The arrangement is so designed that when the contacts such as 11 and 12 are closed due to the counter $S_{1/n}$ being in its first position, the other contacts controlled by the other stages of the counter such as $n1$ and $n2$ are open. The counter will therefore make a complete cycle in a time equal to $n$ times the period of the oscillator S. Each counter stage will include at least one relay.

Each stage of the counter such as $S_1$, in addition to controlling the contacts 11 and 12, also controls the contacts such as 13, 14 and 15 which will therefore all be closed when the counter is in its first condition. This means that the output from the filter F will then be applied alternatively to the condenser $C_{11}$ through contacts 3 in its left hand position and which is controlled by the oscillator S in the same way as contacts 1 and 2, as well as the contacts 13 and 15. When the contacts 1, 2 and 3 reverse, the counter $S_{1/n}$ being still in its first position, the output from the filter F will then be applied through contact 3 in its right hand position, contact 14 to the condenser $C_{12}$ and back through contact 15.

When the oscillator S has completed one period, the counter $S_{1/n}$ will move to its second position and the same operations will be repeated for another pair of input voltages. By connecting all the condensers $C_{11}, C_{12}, \ldots, C_{n1}, C_{n2}$ in series and connecting the load L across the whole series combination, a voltage which is a multiple of the sum of the power on the $n$ lines will be obtained across the load L.

The angular frequency $w_0$ mentioned previously corresponds to the cycling period for the counter $S_{1/n}$ and this period should be chosen in accordance with the remarks made above. It is to be noted however, that whereas with the arrangement of Fig. 1 for example, half of this period was devoted to the charge of a condenser, only $$\frac{1}{2n}$$

of this period will now be used for charging any particular condenser which means that the charge time constant should preferably be smaller in order that the voltage across a condenser reaches its desired value during this portion of a period. Also, whereas a condenser was left disconnected from the detector during half of the period, it will now be left disconnected during $$\frac{2n-1}{2n}$$

of the period which means that the load L should preferably be as large as possible to avoid any leakage effects.

Although relay circuits have been envisaged both for the oscillator S and for the counter $S_{1/n}$, it should be understood that electronic means could also be used for these. For example, if the circuit of Fig. 4 is to be applied for the measurement of power on a three-phase line with no fourth wire or ground return and with an unbalanced load, which means that the two-wattmeter method is of interest, this can be carried out by means of a two-stage counter for adding the two power measurements and this counter may consist of a multivibrator driven by the oscillator S also consisting of a multivibrator. The frequency of the multivibrator constituting the oscillator S will be twice the frequency of the multivibrator constituting the counter $S_{1/2}$ and both multivibrators will control suitable gates to replace the mechanical contacts. If the counter $S_{1/n}$ has more than two stages, a suitable electronic counter can be used.

It should also be realized that although the solution shown in Fig. 4 for additive power measurements will generally be the most interesting, the essential point is to provide a series of $2n$ distinct time intervals which are repeated in a cyclic fashion so that particular combinations of voltages can be applied to the detector during any such time interval resulting in a particular condenser out of $2n$ condensers connected in series being charged from the output of the filter F to the exclusion of the others.

While the principles of the invention have been described above in connection with specific apparatus, it is to be clearly understood that this description is made only by way of example and not as a limitation on the scope of the invention.

I claim:

1. A measuring instrument for measuring the product $EI \cos \Phi$, where E represents the amplitude of an A. C. wave, I the amplitude of another A. C. wave having the same frequency as the first and $\Phi$ the phase shift between said waves, comprising an electric transducer having a transfer admittance characteristic such that when said waves are applied to its input in a linear combination a D. C. component is produced in the output having the form: $f(E, I) + kEI \cos \Phi$; $f(E, I)$ being an even function of E and I, whereas $k$ is a factor depending on the parameters of said transfer admittance characteristic, periodic switching means to alternately apply the sum and the difference of said waves to the input of said electric transducer, two condensers connected in series, other switching means operative synchronously with said first named switching means to apply the D. C. components representing said sum and difference respectively and derived from the output of said electric transducer, successively to respective ones of said condensers, said other switching means being so connected that the charging currents in said condensers are reversed in direction, and a load device connected across the said two condensers in series.

2. Measuring instrument as claimed in claim 1, for measuring a sum of products $E_i I_i \cos \Phi$ $(i=1,2,\ldots,n)$, for $n$ paired waves further characterized by a single quadratic detector intermediate said first and second switching means, a plurality $n$ of condenser pairs, an additional switching means successively to feed the sum and the difference of paired waves to the detector during equal but distinct time intervals for each sum and for each difference, said additional switching means providing a repetitive cycle of $2n$ distinct intervals and other additional switching operative synchronously with the additional switching means, to connect one particular out of $2n$ condensers to be charged by the D. C. output from said detector, the $2n$ condensers being serially connected so that a total voltage across them is obtained which is a constant multiple of the sum of the products $E_i I_i \cos \Phi$.

3. Measuring instrument as claimed in claim 1, characterized in that said electrical means comprise a tube with a variable slope and a quadratic characteristic, said tube having a cathode resistive load and the sum and the difference of said waves being alternatively applied by said switching means to its control grid-cathode circuit.

4. Measuring instrument as claimed in claim 1, characterized in that said electrical means comprises two tubes with variable slopes and quadratic characteristics, a common resistive load for said tubes located in the cathode circuit of the first tube and in the anode circuit of the second tube, said switching means alternately applying sum and the difference of said waves to the control grid-cathode circuit of the first tube, and in synchronism applying the difference and the sum of said waves to the control grid-cathode circuit of the second tube, whereby that part, of said D. C. component of the output which is an even function of the input waves amplitudes will be small if the characteristics of the two tubes are reasonably similar.

References Cited in the file of this patent

UNITED STATES PATENTS

| 2,391,532 | Wilmotte | Dec. 25, 1945 |
| 2,553,294 | Blewett | May 15, 1951 |